(12) United States Patent
Whang et al.

(10) Patent No.: US 6,609,008 B1
(45) Date of Patent: Aug. 19, 2003

(54) METHOD AND APPARATUS FOR CONTROLLING SIGNAL POWER LEVEL IN A COMMUNICATION SYSTEM

(75) Inventors: Keum-Chan Whang, Seoul (KR); Hyuck-Chan Kwon, Seoul (KR)

(73) Assignee: Qualcomm Incoporated, San Diego, CA (US)

( * ) Notice: Subject to any disclaimer, the term of this patent is extended or adjusted under 35 U.S.C. 154(b) by 402 days.

(21) Appl. No.: 09/711,110

(22) Filed: Nov. 9, 2000

(51) Int. Cl.[7] ................... H04B 7/00; H04B 7/185; H04Q 7/20
(52) U.S. Cl. ................ 455/522; 370/318; 455/69; 375/297; 375/346; 375/350
(58) Field of Search ................. 455/522, 134, 455/69, 70, 67.6, 127, 226.3, 226.1, 226.2; 370/318, 317, 320, 342; 375/346, 312, 349, 219, 221, 285, 232–236, 340, 341, 343, 350, 297

(56) References Cited

U.S. PATENT DOCUMENTS

| | | | | | |
|---|---|---|---|---|---|
| 5,898,740 | A | | 4/1999 | Laakso et al. | 375/346 |
| 6,032,026 | A | * | 2/2000 | Seki et al. | 455/63 |
| 6,373,823 | B1 | * | 4/2002 | Chen et al. | 455/522 |
| 6,385,183 | B1 | * | 5/2002 | Takeo | 370/318 |
| 6,473,451 | B1 | * | 10/2002 | Seki et al. | 370/342 |
| 6,493,541 | B1 | * | 12/2002 | Gunnarsson et al. | 455/69 |
| 6,529,482 | B1 | * | 3/2003 | Lundby | 370/342 |
| 2001/0019961 | A1 | * | 9/2001 | Nakahara et al. | 455/522 |
| 2002/0027960 | A1 | * | 3/2002 | Haim | 375/297 |

FOREIGN PATENT DOCUMENTS

| | | | |
|---|---|---|---|
| EP | 0853393 | A1 | 7/1998 |
| EP | 0863618 | A2 | 9/1998 |
| EP | 0977371 | A2 | 2/2000 |
| JP | 6-132872 | * | 5/1994 |
| WO | 02/01733 | A2 | 1/2002 |

OTHER PUBLICATIONS

T. Suzuki, "An Effective CIC (Co-Channel Interference Canceller) Scheme for Multi-Rate CDMA," VTC 2000-Fall. IEEE VTS $52^{nd}$. Vehicular Technology Conference. Boston, MA, Sep. 24–28, 2000. IEEE Vehicular Technology Conference, NY: IEEE, US, vol. 3 of 6, CONF. 52, Sep. 24, 2000, pp. 1382–1386.
I. Seskar, et al., "Implementation Aspects for Successive Interference Cancellation in DS/CDMA Systems," Wireless networks, ACM, US, vol. 4, No. 6, Oct. 1, 1998, pp. 447–452.
Kwon, et al., "Performance of Interference Cancellation Techniques for Turbo Coded CDMA Systems Over Fading Channels" PIMRC '99, Osaka, Japan, Sep. 12–15, 1999, pp. 593–597.
Kwon, et al., "Turbo Coded CDMA System With An Interference Cancellation Technique" IEICE Trans. Commun. E81–B(12): 2326–2333 (1998).
Reed, et al. "Iterative Multiuser Detection for CDMA with FEC: Near-Single-User Performance" IEEE Transactions on Communications 46(12): 1693–1699 (Dec. 1998).
Shurk, et al., "Integrated Interference Cancellation and Decoding for CDMA Systems Using Turbo Code" IEEE pp. 1162–1166 (1999).
Wang, et al. "Turbo Multiuser Detection for Turbo-Coded CDMA" IEEE pp. 1456–1460 (1999).
Wang, et al. "Iterative (Turbo) Soft Interference Cancellation and Decoding for Coded CDMA" IEEE Transactions on Communications 47(7): 1046–1061 (Jul. 1999).

* cited by examiner

Primary Examiner—Tracy Legree
(74) Attorney, Agent, or Firm—Philip R. Wadsworth; Kent D. Baker; S. Hossain Beladi

(57) ABSTRACT

A novel and improved method and apparatus for controlling signal power level in a communication system (100) is provided by determining first and second signal to interference ratios of a received signal, respectively before and after an interference cancellation, determining a difference between the first and second signal to interference ratios, and determining, based on the difference, a signal to interference threshold for controlling power level of a signal transmitted from a source of the received signal.

12 Claims, 9 Drawing Sheets

METHOD AND APPARATUS FOR CONTROLLING SIGNAL POWER LEVEL IN A COMMUNICATION SYSTEM

BACKGROUND

I. Field

The disclosed embodiments relate to the field of communications. More particularly, the disclosed embodiments relate to control of signal power level for reducing interference, and efficient signal processing in a receiver for canceling signal interference.

II. Background

Code division multiple access (CDMA) communication systems have been in commercial operations for a number of years. In CDMA communication systems, a number of users in the same geographical area may choose to operate on a common carrier frequency. The signal from each user is coded according to a unique assigned code. A receiver receiving signals from the users with common carrier frequency decodes each signal according to the assigned code. While the signal is being decoded, the signals transmitted from all other users may be treated as interference. To control the interference level, one of the basic principles for operating a CDMA system is based on a method and apparatus for controlling the power level of signals transmitted by different users of the system. Other reasons, such as conserving battery power, for controlling power level of signals in a CDMA system are well known by one of ordinary skill in the relevant art.

Generally, to combat the effect of interference, a user may increase its signal power level, or the communication data rate, or both. As more users increase the signal power level or the communication data rate, the level of interference experienced by other users is also increased. As such, there is a need for controlling the power level of each signal transmitted by each user such that the interference level experienced by each user is minimized. Moreover, there is a need for efficient signal processing in a receiver for canceling signal interference.

SUMMARY

A novel and improved method and apparatus for controlling signal power level in a communication system is provided by determining first and second signal to interference ratios of a received signal respectively before and after an interference cancellation, determining a difference between the first and second signal to interference ratios, and determining, based on the difference, a signal to interference threshold for controlling a power level of a signal transmitted from a source of the received signal.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION OF THE PREFERRED EMBODIMENT(S)

Figure 1:
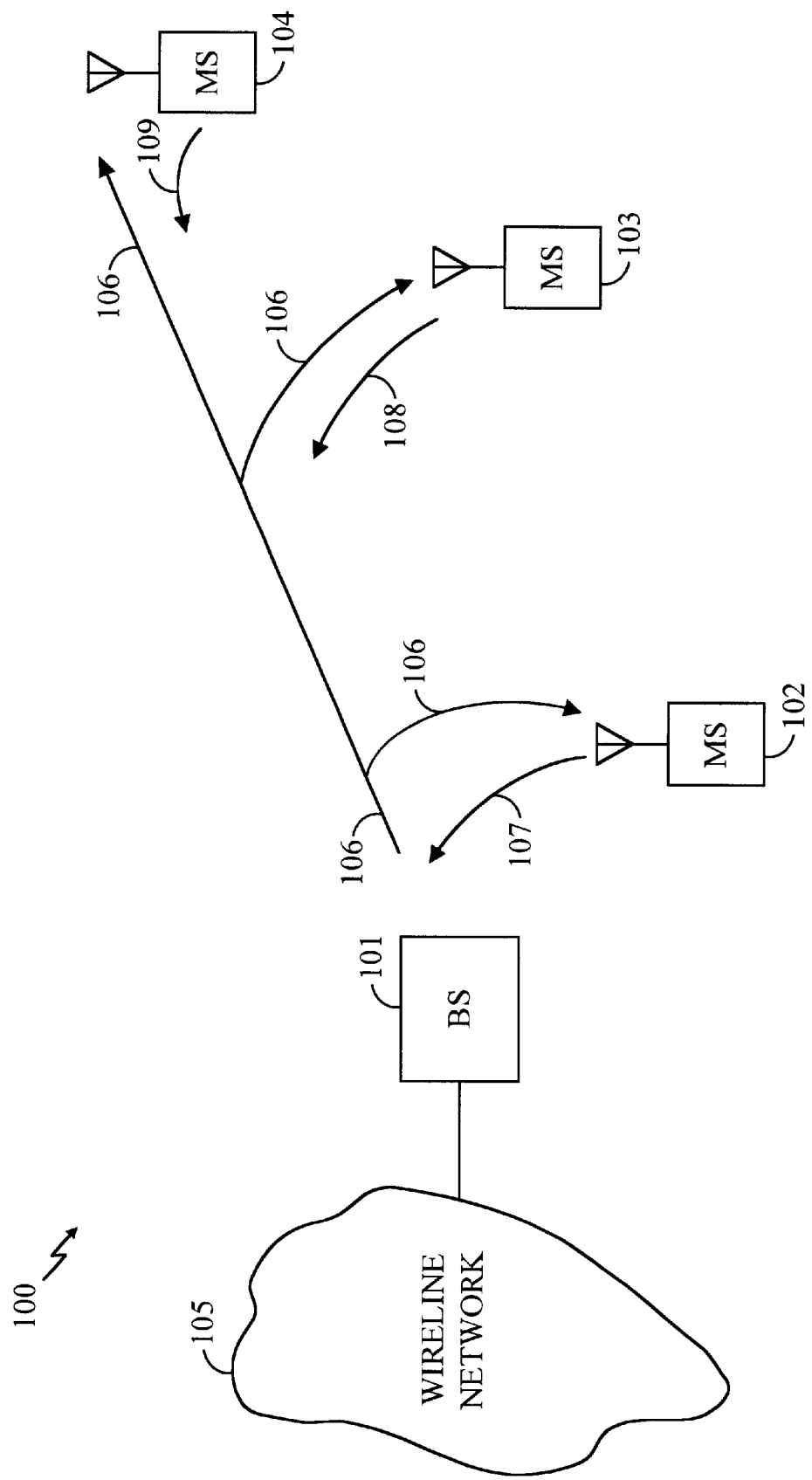
FIG. 1 illustrates a general block diagram of a communication system.

FIG. 1 illustrates a general block diagram of a communication system 100 capable of operating according to any of the code division multiple access communication system standards. Such standards include the TIA/EIA-95 standard, TIA/EIA-IS-2000 standard, IMT-2000 standard, and WCDMA standard, all incorporated by reference herein. A copy of the standards may be obtained by accessing the world wide web at an appropriate address or by writing to TIA, Standards and Technology Department, 2500 Wilson Boulevard, Arlington, Va. 22201, United States of America. Generally, communication system 100 includes a base station (BS) 101 that provides communication links between a number of mobile stations, such as mobile stations 102–104, and between the mobile stations 102–104 and a wireline network 105. BS 101 may include a number of components, such as a mobile station controller, a base station controller, and a radio frequency transceiver. BS 101 may also be in communication with other base stations (not shown for simplicity.) BS 101 communicates with each mobile station (MS) via a forward link. The forward link is maintained by a forward link signal 106 transmitted from BS 101. The signals targeted for several mobile stations 102–104 may be summed to form signal 106. Each of MSs 102–104 receiving signal 106 decodes the received signal 106 to extract the information that is targeted for the user of the receiving MSs 102–104. Each receiving MSs 102–104 may treat the portion of the received signal targeted for other receiving mobile stations as interference. Each MSs 102–104 communicates with BS 101 via a reverse link signal, such as reverse link signals 107–109 for respectively MSs 102–104.

BS 101 may also transmit a predefined series of data bits on a pilot channel via the forward link to all mobile stations to assist each mobile station in decoding the forward link signal 106. Each MS may transmit a pilot channel to BS 101. The pilot channel transmitted from the MS may be used for decoding the information carried by the reverse link signal transmitted from the MS. The use and operation of a pilot channel are well known. A transmitter and a receiver for communicating via the forward and reverse links are included in each mobile stations 102–104 and BS 101.

Figure 2:
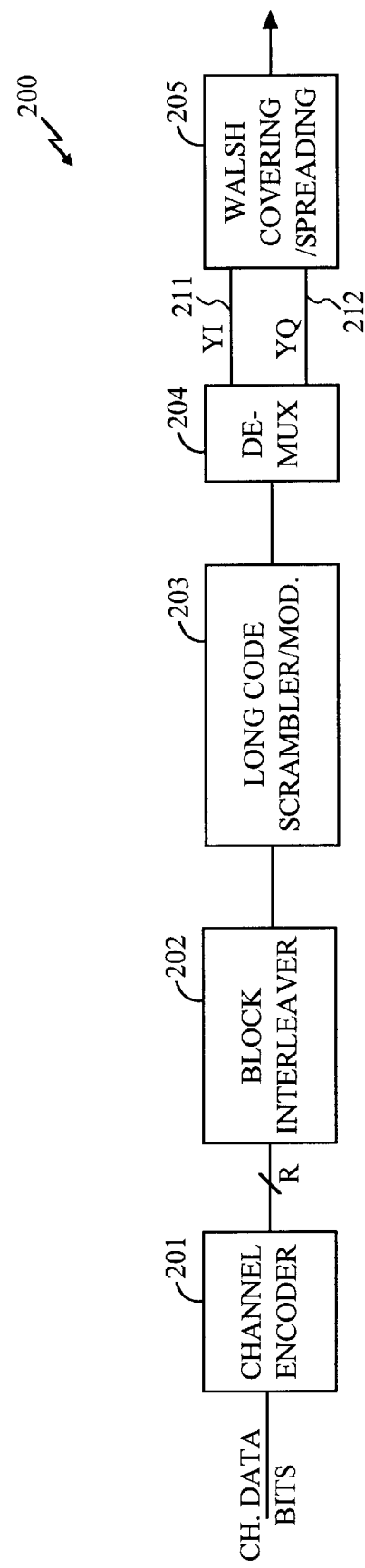
FIG. 2 illustrates a general block diagram of a transmitter.

FIG. 2 illustrates a general block diagram of a transmitter 200 for use in BS 101 and mobile stations 102–104 in accordance with one embodiment. Transmitter 200 may be used in a CDMA system operating according to the IS-2000 standard. Channel data bits are input to a channel encoder 201 to produce encoded channel data symbols. The functions in channel encoder 201 may include adding frame quality bits, and performing convolutional and/or turbo encoding. One block of data is transmitted in each time frame. The encoding rate may be ½, ¼, or any other encoding rate. After encoding, R number of data symbols are produced for every encoded data bit. As a result, R number of blocks of data are produced for every block of data at the input of encoder 201. In case of encoding at the rate ½, two blocks of data are produced at the output of encoder 201 for each input block. Encoder 201 passes the channel encoded symbols to a block interleaver 202 for an interleaving function. Block interleaver 202 rearranges the position of the data symbols in each block of data according to an interleaving function while writing the data into a RAM block (not shown), and outputs the rearranged block of data from the RAM block. The interleaved data symbols are input to a long code scrambling/modulator block 203 where data symbols in each channel are scrambled with a long code mask. A long code mask is assigned to each user. Other functions such as power control symbol puncturing may also take place in long code scrambling/modulator block 203. Each power control symbol commands the user to increase or decrease the power level of its reverse link signal. A demultiplexer 204 de-multiplexes the output of the long code scrambling/modulator block 203 to produce in-phase data symbol 211, and quad-phase data symbol 213 for Welsh covering and BPSK or QPSK PN spreading. Since QPSK PN spreading may be used, two data symbols may be outputted simultaneously from de-multiplexer 204. A Welsh covering/spreading block 205 modulates and spreads the input data symbols for subsequent amplification and transmission from an antenna system (not shown.)

Figure 3:
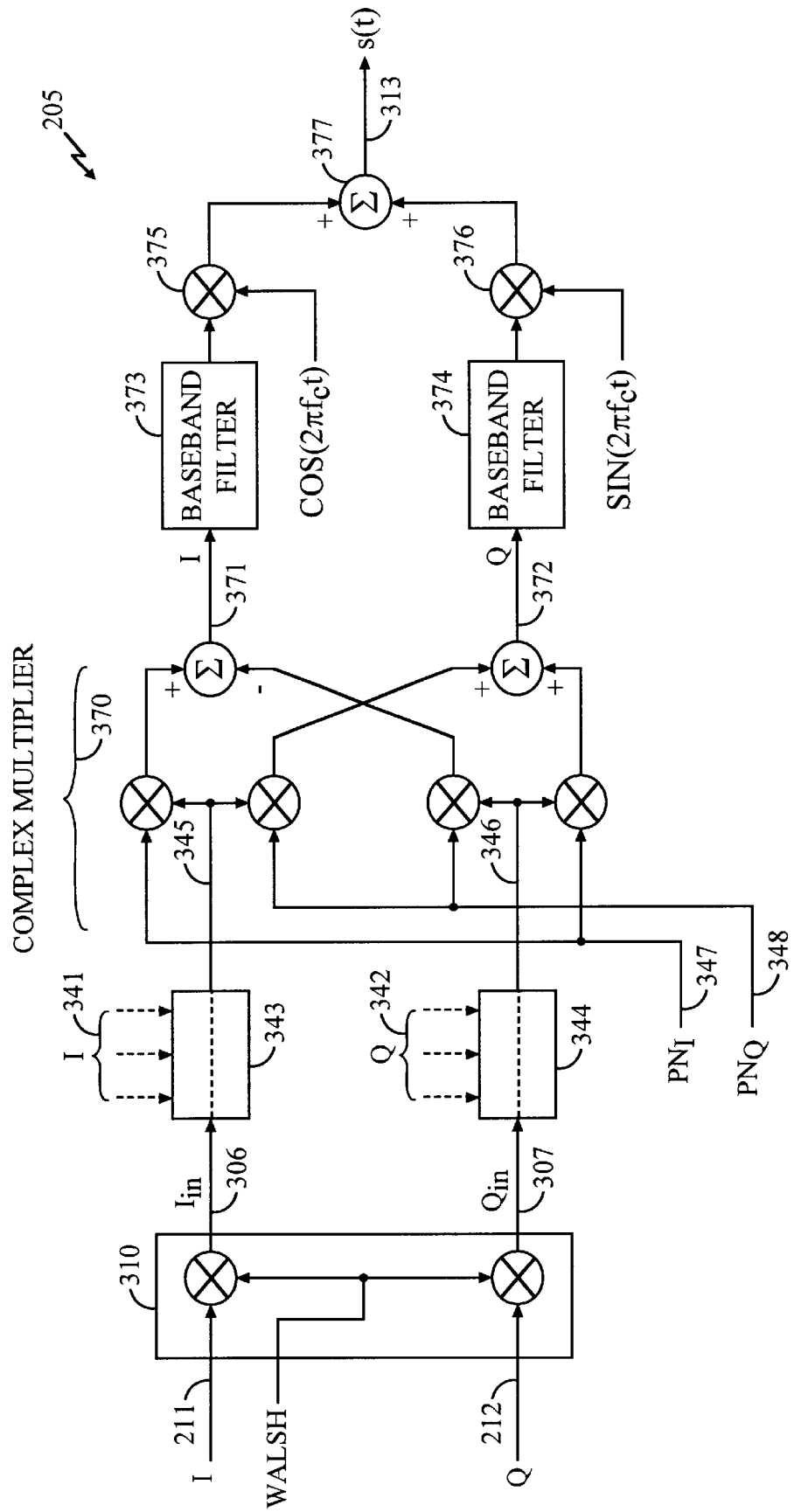
FIG. 3 illustrates a block diagram of a Welsh covering/spreading module that may be used in the transmitter of FIG. 2.

FIG. 3 illustrates a block diagram of Welsh covering/spreading block 205 in accordance with one embodiment. Operations of block 205 as shown include the Walsh cover operation, summing operation for summing forward link signals targeted for the mobile stations, complex multiplier operation, base band filtering operation, and carrier modulation operation to produce signal 313 for amplification and transmission from BS 101 to the mobile stations in the coverage area. Block 205 may also be used by the mobile stations for transmission of the reverse link signals. Block 205 may include more or less operations in a variety of configurations. A Walsh code normally is assigned to each channel in each of the forward and reverse links. After long code scrambling, the resulting I and Q signals 211, 212 pass through a Walsh cover operation. The Walsh cover operation for a channel is shown in a Walsh cover block 310. The Walsh cover operation in block 310 includes multiplying the input I and Q signals 211, 212 by the assigned Walsh function to produce Walsh covered I and Q signals 306, 307.

The forward link signal may be a combined signal of several signals, each targeted for a mobile station. If there are other signals to be combined to form the forward link signal, I and Q signals 341, 342 of other channels, after being Walsh covered by respective Walsh codes, like the Walsh cover operation in Walsh cover block 310, are inputs to summing blocks 343 and 344. Before Walsh cover operation, I signals 341 and Q signals 342 are passed through encoding, block interleaving operations, and long code scrambling operations similar to the operations shown for I signal 211 and Q signal 212. After the Walsh cover operations, I signals 306 and 341 are summed in summing block 343, and Q signals 307 and 342 are summed in summing block 344. The results are combined I-signal 345, and combined Q-signal 346. Signals 306 and 307 pass through as signals 345 and 346 when there is no signals for the summing operation in summers 343 and 344.

The next operation in block 205 includes complex multiplier operation 370 via PNI sequence 347 and PNQ sequence 348. PNI and PNQ sequences 347 and 348 are I and Q channels PN sequences. Signals 345 and 346 are complex multiplied by PNI and PNQ sequences 347 and 348. The operation of complex multiplier 370 allows spreading signals 345 and 346 to produce I and Q signals 371 and 372. Base band filters 373 and 374 may be used to filter I and Q signals 371 and 372. To carrier modulate I and Q signals 371 and 372 after filtering, multipliers 375 and 376 are used. The resulting signals are combined in a combiner 377 to produce combined signal 313. Signal 313 may be amplified for transmission from an antenna system (not shown.)

Figure 4:
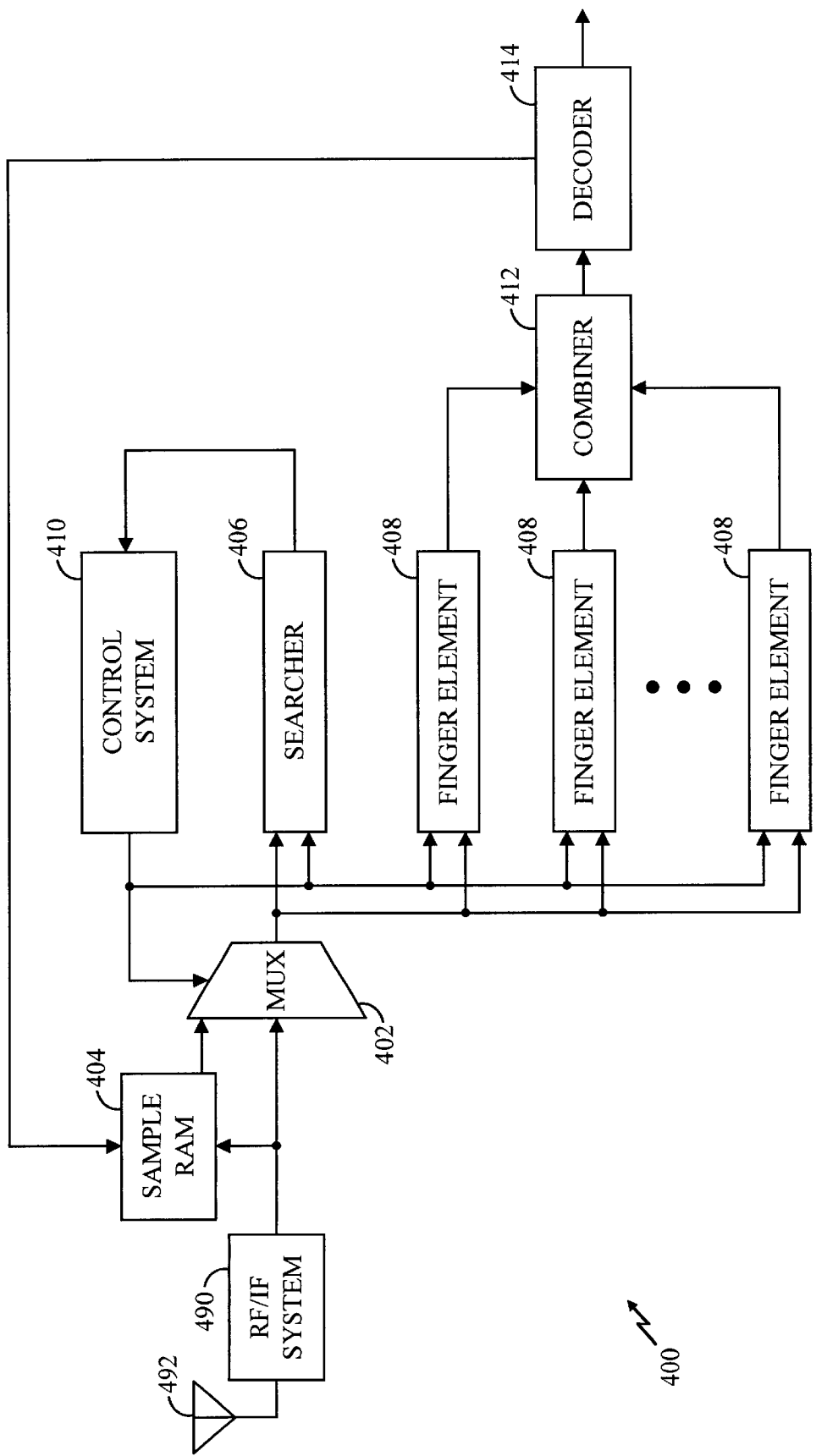
FIG. 4 illustrates a block diagram of a receiver.

FIG. 4 illustrates a block diagram of a receiver 400 used for processing CDMA signals. Receiver 400 demodulates the received signal to extract the information carried by the received signal. Receive (Rx) samples are stored in RAM 404. Receive samples are generated by a radio frequency/intermediate frequency (RF/IF) system 490 and an antenna system 492. Antenna system 492 receives an RF signal, and passes the RF signal to RF/IF system 490. RF/IF system 490 may be any conventional RF/IF receiver. The received RF signals are filtered, down-converted, and digitized to form RX samples at baseband frequencies in accordance with one embodiment. The samples are supplied to a demultiplexer (demux) 402. The output of demux 402 is supplied to a searcher unit 406, and finger elements 408. A control unit 410 is coupled thereto. A combiner 412 couples a decoder 414 to finger elements 408. In one embodiment, control unit 410 is a microprocessor controlled by software, and may be located on the same integrated circuit or on a separate integrated circuit.

During operation, receive samples are applied to demux 402. Demux 402 supplies the samples to searcher unit 406, and finger elements 408. Control unit 410 configures finger elements 408 to perform demodulation of the received signal at different time offsets based on search results from searcher unit 406. The results of the demodulation are combined and passed to decoder 414. Decoder 414 decodes the data, and outputs the decoded data.

In general for searching, searcher 406 uses non-coherent demodulation of a pilot channel to test timing hypotheses and phase offsets corresponding to various transmitting sources and multi-paths. The demodulation performed by finger elements 408 is performed via coherent demodulation of other channels such as control and traffic channels. The information extracted by searcher 406 is used in finger elements 408 for demodulation of other channels. The searcher 406 and finger elements 408 may provide both pilot channel searching, and demodulation of control and traffic channels. The demodulation and searching can be performed at various time offsets. The results of the demodulation may be combined in combiner 412 before decoding the data on each channel. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 400 may be used in BS 101 and mobile stations 102–104 for decoding the information on respectively reverse and forward links signals. BS 101 may employ several of receiver 400 to decode the information transmitted from several mobile stations at the same time.

Figure 5:
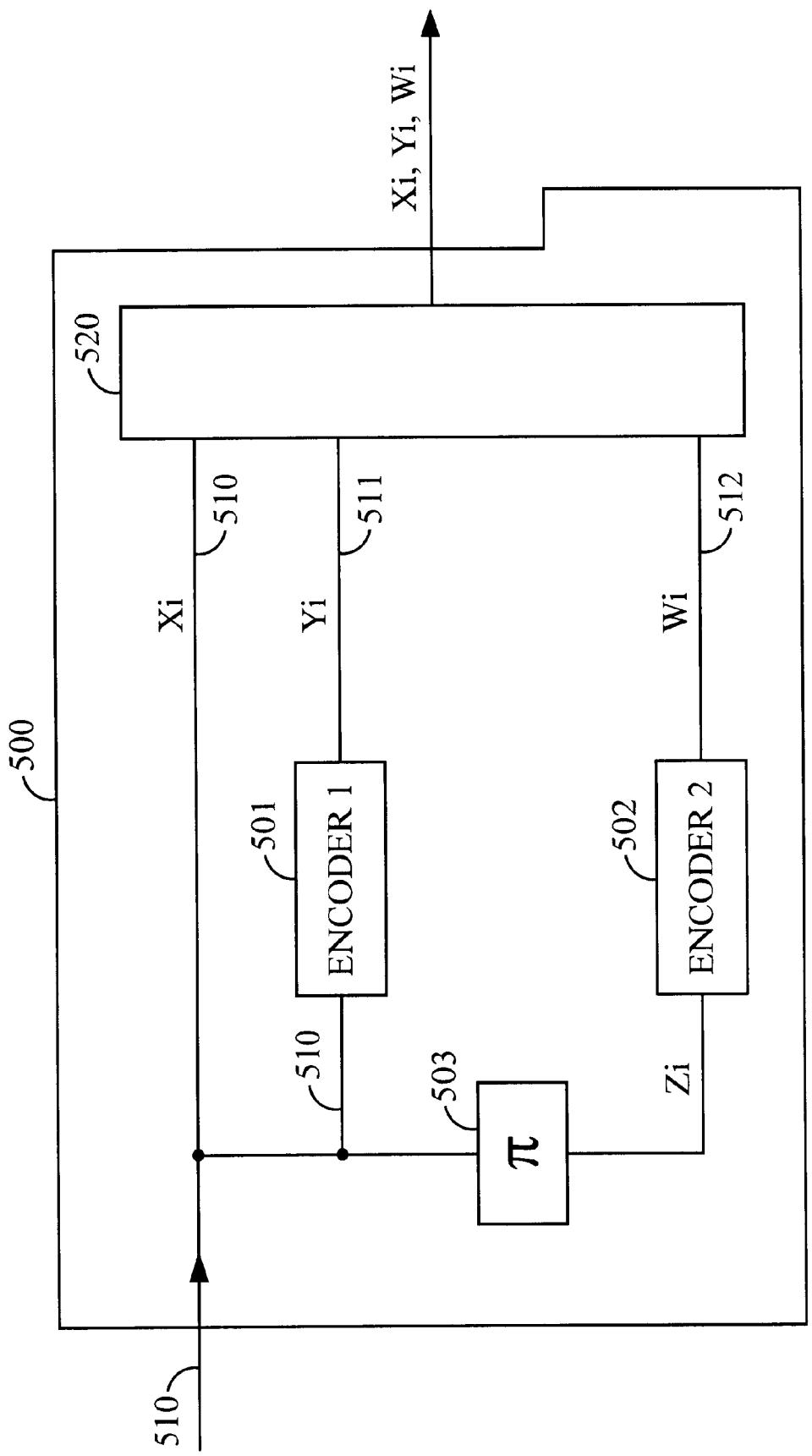
FIG. 5 illustrates a block diagram of an exemplary turbo encoder.

FIG. 5 illustrates a block diagram of an exemplary turbo encoder 500 that may be used in channel encoder 201 for turbo encoding the channel data bits. Turbo encoder 500 includes a first and second encoder blocks 501 and 502, and an interleaver block 503. Data symbols Xi input turbo code 500 at an input 510 of encoder 501. Encoder 501 produces data symbols Yi after encoding according to a convolutional encoding operation. A convolutional encoding operation may include encoding according to a convolutional code transfer function. Such a function may be defined by a transfer function $F(D)=(1+D+D**2)/(1+D)$, where D denotes a delay step and the plus sign (+) denotes an exclusive OR operation. Implementation of such a function is well known by one of ordinary skill in a relevant art. Encoding block 502 outputs data symbols Yi. Data symbols Xi input interleaver 503 for an interleaving operation to produce data symbols Zi. The interleaving operation in interleaver 503 may be according to any of the known interleaver operations. Data symbols Zi consist of data symbols Xi re-arranged in an order according to an interleaving mapping function. Encoder 502 encodes data symbols Zi and outputs data symbols Wi according to an encoding function used in encoder 502. Encoding functions used in encoders 501 and 502 may be the same or different.

Data symbols Xi, Yi and Wi pass to a puncturing block 520. Puncturing block 520 receives data symbols Xi at input 510, data symbols Yi produced by encoder 501 at an input 511, and data symbols Wi produced by encoder 502 at an input 512. Puncturing block 520 according to a puncturing pattern selects data symbols from data symbols Xi, Yi and Wi. The selected data symbols are passed on to block interleaver 202 for a data block interleaving operation. As such, the transmitted data symbols consist mainly of data symbols Xi, Yi and Wi.

Transmission of data symbols Xi, Yi and Wi may include signal processing, up-conversion to an appropriate frequency and signal amplification. Such a transmitter is well known by one of ordinary skill in the art. The entire process of transmission, propagation and reception by the destination receiver may include adding noise and interference to data symbols Xi, Yi and Wi. Decoder 414 in receiver 400 receives the noisy version of data symbols Xi, Yi and Wi.

Figure 6:
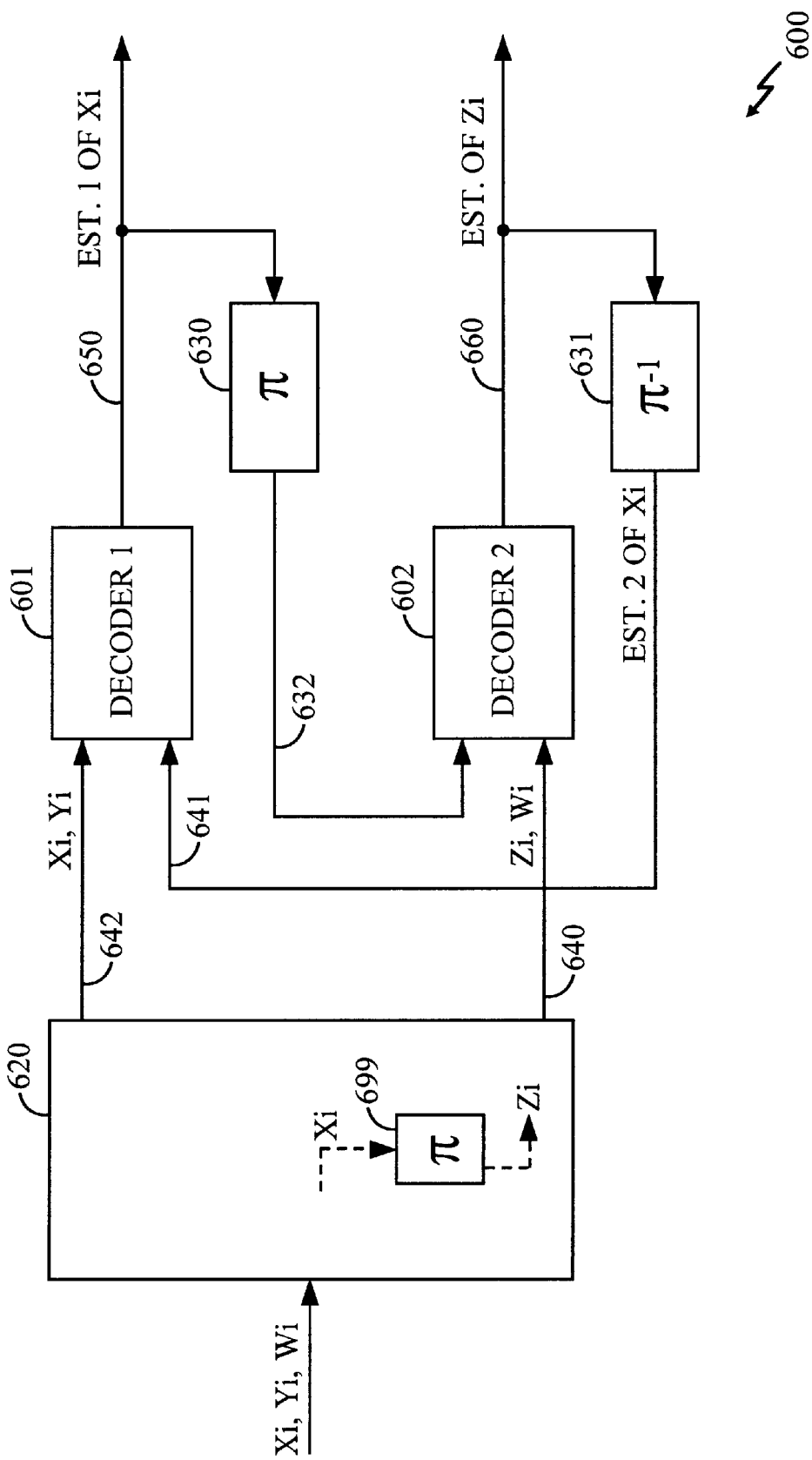
FIG. 6 illustrates a block diagram of a conventional turbo decoder.

FIG. 6 illustrates a block diagram of a conventional turbo decoder 600 for decoding data symbols Xi, Yi and Wi to produce estimates of data symbols Xi. Decoder 600 may be used in decoder block 414 of receiver 400. Data symbols Xi, Yi and Wi pass through a data symbol selector block 620 which operates to select data symbols Xi and Yi for routing to a decoder block 601 at an input 642. Data symbols Xi internally pass through an interleaver 699 to locally reproduce data symbols Zi. Data symbols Zi and Wi pass to a decoder block 602 at an input 640. Decoder 601 decodes data symbols Xi and Yi according to a coding function used in encoder block 501. Decoder 601 produces estimates of data symbols Xi at an output 650. Decoder 602 decodes data symbols Zi and Wi according to a coding function used in encoder block 502. Decoder 602 produces estimates of data symbols Zi at an output 660.

To increase the confidence level for the estimates of the data symbols Xi, the estimates of data symbols Xi at output 650 pass through an interleaver 630 to produce the estimates of data symbols Zi at an input 632 of decoder 602. Decoder 602 uses the estimates of data symbols Zi at input 632 with the estimates of data symbols at input 640 to produce new estimates of data symbols Zi at output 660. The estimates of data symbols Zi at output 660 pass through a de-interleaver 631 to reverse the process of interleaving function of interleaver 530 in turbo encoder 500, and to produce estimates of data symbols Xi at an input 641. The estimates of data symbols Xi at input 641 are used with the estimates of data symbols at input 642 to produce estimates of data symbols Xi at output 650. The process may be repeated until confidence for the estimates of data symbols Xi reaches an acceptable level. When the turbo decoding process takes several stages to complete, input 641 may be used to input estimate of data symbol Xi from one stage to the next stage. The estimate of data symbol Xi from a previous stage may help improving the decoding process at a next stage.

Figure 7:
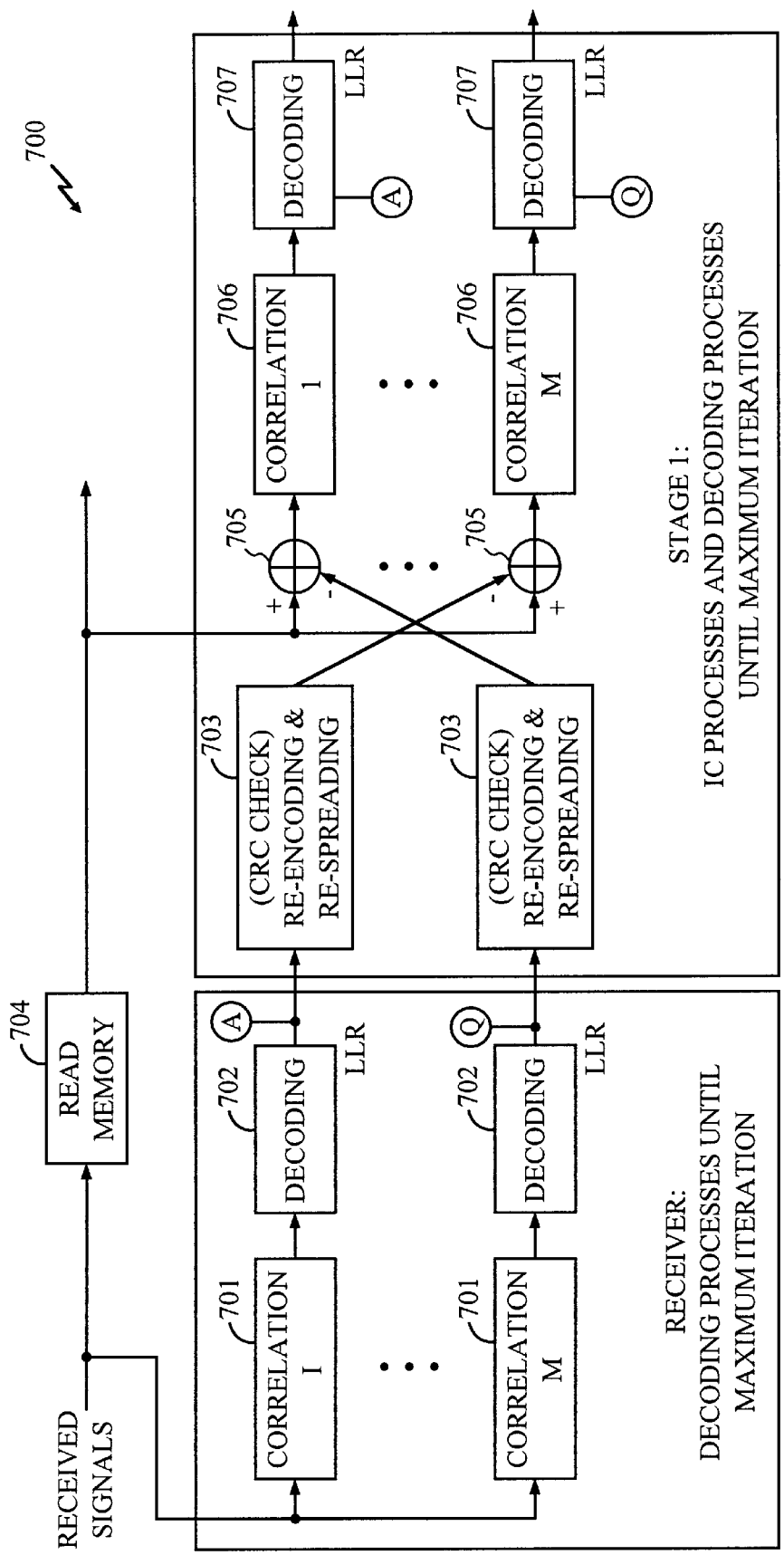
FIG. 7 illustrates an operational flow diagram for interference cancellation in a receiver.

FIG. 7 illustrates an operational flow diagram 700 for interference cancellation in a receiver, such as receiver 400, in accordance with one embodiment. The received samples, after being read from RAM 404, are passed through a correlation process at a correlation step 701 for each signal received from the mobile stations. The correlation process may collectively be described as the operations of searcher 406, finger element 408, and combiner 412. Since the received samples contain samples from the signals transmitted from more than one mobile station (for example M number of signals from M number of mobile stations), the correlation process may be repeated for each received signal at correlation step 701 for signals 1-M. The correlation process for each received signal may be unique because each signal may require a different correlation parameters as of those found for operations of searcher 406, finger element 408, and combiner 412. Each signal may include a traffic channel and a pilot channel. The PN sequence assigned to the traffic channel and pilot channel carried by each signal may be different. The correlation process may include channel estimation which includes estimating the channel fading characteristics based on the result of correlating with the pilot channel. The channel estimation informations are then used for correlating with the traffic channel. Each traffic channel is then decoded.

The result from each correlation process passes through a decoding step 702. Decoder 414 may perform the decoding step. If the transmitted channel is encoded via a convolutional encoding process, decoding step 414 is performed according to the utilized convolutional code. If the transmitted channel is encoded via a turbo encoding process, decoding step 414 is performed according to the utilized turbo code. The turbo decoding operation shown in decoder 600 may be used in decoder 414. Each signal is, therefore, decoded to provide enough information about whether a pass indicator is produced for each cyclic redundancy check (CRC) associated with each transmitted frame of data. Operation and use of CRC in a communication system are well known.

The CRC check is a temporary decision part of the interference cancellation. If the CRC is passed, the decoded result of the channel associated with the passed CRC is re-encoded and re-spread at step 703 to produce re-encoded and re-spread samples. For example, if the decoded channel is a traffic channel associated with a user, the same PN code used by the user to transmit the traffic channel is employed in the re-spreading process. Similarly, the same encoding process used for transmitting the channel is employed in the re-encoding process. The process of re-encoding and respreading may involve determining the channel estimate for each channel. The channel estimate for each channel is determined based on the associated pilot channel fading characteristics. The results of the channel estimate determined for each traffic channel are used in the re-spreading and re-encoding process to form the RX samples for the cancellation process. After each channel is re-encoded and respread, the result of the channel estimation is multiplied by the re-encoded and re-spread traffic channel signal. The result is then used for the cancellation process at step 705. Such re-encoding and re-spreading may be performed by a digital signal processor or a software controlled microprocessor.

The original samples may be read at step 704 from memory. The re-encoded and re-spread samples are multiplied by the channel estimation parameters produced as a result of decoding an associated pilot channel before using them for the cancellation process at step 705. At step 705, the channel modified re-encoded and re-spread samples are subtracted from the received samples. RAM 404 may store the resulting samples until the process is completed. The results are passed on to correlation step 706. The correlation processes for signal 1 through M are repeated at step 706 for the samples produced at step 705. The results of correlation step 706 are decoded at decoding step 707. The results of decoding step 707 at this point have less error than the results of decoding step 702 because of the cancellation process performed at step 705. The process may be repeated by checking the CRC of the decoded results at step 707, and performing further cancellation of samples like those performed at step 705. Such iteration process may be repeated as many times as desired. After each cancellation, the resulting received samples are stored in memory. If another cancellation step becomes necessary, the newly stored samples are used.

If a turbo encoder is used in the system, the encoding process at steps 702 and 707 needs to be in accordance with a turbo decoding process, such as the exemplary embodiment shown in FIG. 6. The turbo decoding process may include an iterative process. Also, estimates of Xi determined at one step may be used as a feedback in a next iterative step to decode data symbol Xi. Such an iterative process as explained improves the confidence level associated with a true estimate of the data symbol Xi. As such, in case of decoding at step 702 in accordance with a turbo decoding process, the estimated results from decoding step 702 may be used at decoding step 707 to improve the decoding process at step 707. For example, the estimates of data symbols Xi associated with the different channels (shown as "A through Q") at step 702 are input at decoding step 707. For example, data symbols Xi associated with the first channel (shown as "A") are used at the decoding step 707 associated with the same channel.

The process of re-encoding and re-spreading may involve re-estimating the channel parameters, if there has been at least one cancellation step. Such parameters include fading parameters associated with a pilot channel. The channel is re-estimated for each pilot channel associated with each user after each cancellation process. The channel estimate parameters for the same user may be different after each cancellation step due to cancellation of samples from the RX samples. The reestimated channel is then used to reconstruct the re-spread and re-encoded signal for the next cancellation process. Such a channel re-estimation and its use for generating re-encoded and re-spread samples may be necessary to provide accurate samples for each cancellation process at different stages. As a result, the samples used for the cancellation step, and produced by the cancellation process are more accurate. When the cancellation process involves inaccurate cancellation of amplitude and phase from the received samples, the process of decoding at a later stage may be degraded. As such, the samples used for each cancellation process may have to be accurately replicated samples of the signal forming the traffic and pilot channels, which are both associated with a common user.

The signals received by BS 101 may be input to receiver 400. Antenna system 492 and RF/IF system 490 receive the signals from the mobile stations to produce the samples of the received signals. The received samples may be stored in RAM 404. Receiver 400 may incorporate a number of searchers 406, a number of finger elements 408, a number of combiners 412, and a number of decoders 414 for simultaneously performing the correlation steps of 701 and 706 and the decoding steps of 702 and 707 for all the signals received from different mobile stations. However, only one antenna system 492 and RF/IF system 490 may be necessary. If the transmitted signals have passed through a turbo encoding process at the transmitter, decoding steps 702 and 707 performed by decoder 414 may be according to the operation of turbo decoder 600 shown in FIG. 6.

Generally stated, in communication system 100, RF/IF system 490 converts an encoded and spectrum spread received signal to received samples. The received samples may be stored in RAM 404. Searcher 406 in combination with finger element 408 determines a first channel estimate based on a first set of pilot signal samples. The first set of pilot signal samples are included in the received samples. Finger element 408, combiner 412, and decoder 414 correlate and decode the received samples in accordance with the first channel estimate to produce decoded received samples. Controller 410 in connection with other blocks, such as RAM 404, re-encodes and re-spreads the decoded received samples to produce re-encoded and re-spread samples. Moreover, controller 410 modifies the re-encoded and re-spread samples based on the first channel estimate to produce channel modified re-encoded and re-spread samples. The modifying step may include multiplying the re-encoded and re-spread samples by the first channel estimate to produce the channel modified re-encoded and re-spread samples. Controller 410 performs interference cancellation on the received samples by using the channel modified re-encoded and re-spread samples to produce a new set of received samples. The new set of received samples may be stored in RAM 404. The new set of received samples as a result are conditioned for accurate and efficient subsequent signal processing because the cancelled components from the samples are based on the modified re-encoded and re-spread samples. The modified re-encoded and re-spread samples represent accurate samples in terms of amplitude and phase for the cancellation process. Such an accuracy is achieved by including the channel estimate information in the process of generating the modified re-encoded and re-spread samples.

For subsequent signal processing of the received signal as a part of the iterative process, searcher 406 in combination with finger element 408 determines a second channel estimate based on a second set of pilot signal samples. The second set of pilot samples are included in the new set of received samples. Determining the second channel estimate may be necessary because the new set of received samples have at least one cancelled component from the original received samples. Finger element 408, combiner 412, and decoder 414 in combination correlate and decode the new received samples in accordance with the second channel estimate to produce new decoded received samples. Controller 410 re-encodes and re-spreads the new decoded received samples to produce new re-encoded and re-spread samples. Controller 410 modifies the new re-encoded and re-spread samples based on the second channel estimate to produce new channel modified re-encoded and re-spread samples. The modifying process may include multiplying the new re-encoded and re-spread samples by the second channel estimate to produce the new channel modified re-encoded and re-spread samples. Controller 410 performs interference cancellation on the new set of received samples by using the new channel modified re-encoded and re-spread samples to produce another new set of received samples. The newly generated set of received samples as a result are conditioned for accurate and efficient subsequent signal processing because the cancelled components from the samples are based on the new modified re-encoded and re-spread samples. The new modified re-encoded and re-spread samples represent accurate samples in terms of amplitude and phase for the cancellation process. Such an accuracy is achieved by including the second channel estimate information in the process of generating the new modified re-encoded and re-spread samples. The iterative process may be repeated as many times as it is necessary.

The decoding process may be in accordance with a turbo decoding process or a convolutional decoding process. Each time a decoding process takes place on a channel, the controller 410 may determine whether a cyclic redundancy check based on a result of the decoding process passes a predetermined criterion. The cancellation process may be conditioned on whether the cyclic redundancy check passes. If the cyclic redundancy check does not pass, the decoding result may not be suitable for re-encoding and respreading and its subsequent use for the cancellation process. In case of decoding in accordance with a turbo decoding process, a result of decoding at one iteration may be used in assisting the decoding process at a subsequent step after the cancellation process.

Each time a correlation process is performed, searcher 406 and finger element 408 may start anew for determining non-coherent demodulation of a pilot channel to test timing hypotheses and phase offsets. Searcher 406, or finger element 408, or searcher 406 and finger element 408 in combination, may determine the signal to interference ratio (S/I) for each received signal. The interference level of each signal may be reduced each time some samples are subtracted at step 705 from the received samples. As such, the S/I may be different each time the interference cancellation process 700 passes through one iteration. The ratio Eb/I may be synonymous with the ratio S/I. The ratio Eb/I is a measure of signal energy over interference per unit of a data symbol or data bit. Therefore, S/I and Eb/I may be interchangeable in some respects.

In order for an MS to receive communication services from a BS, the MS may have to go through several logical states. The first state may be the initial access state for registering with the BS to set up a communication link. The next state may be the idle state in which the MS has completed the initial registration and protocol exchanges with the BS. In the idle state, the MS may wake up and initiate a communication link with the BS, either by a user of the MS or the BS. In the next state, the MS may be in a connected state. In the connected state, the MS is either receiving data or waiting to receive data. There are periodic forward and reverse link communications between the MS and the BS.

To control interference, the system controls the signal level transmitted from each MS, or the communication data rate, or both. Generally, each MS determines the needed reverse link power level to support both the traffic channel and the pilot channel. Various power control schemes for controlling power levels of signals transmitted from an MS in a communication system are known. One or more examples are described in the Mobile Station-Base Station Compatibility Standard for Wideband Spread Spectrum Cellular Systems, otherwise known as TIA/EIA-95 and TIA/EIA-2000 standards, incorporated by reference herein. The output power level of the MSs is controlled by two independent control loops, open loop and closed loop. The open loop power control is based on the need of each MS to maintain an adequate communication link with the BS. Therefore, the MS closer to the BS needs less power than the MS further away. A strong receive signal at the MS indicates less propagation loss between the MS and the BS, and thus requires a weaker reverse link transmit power level. In the open loop power control, the MS sets the transmit power level of the reverse link based on independent measurements of S/I of at least one received channel, such as pilot, paging, sync, and traffic channels. The MS may make the independent measurement prior to power level setting on the reverse link.

Figure 8:
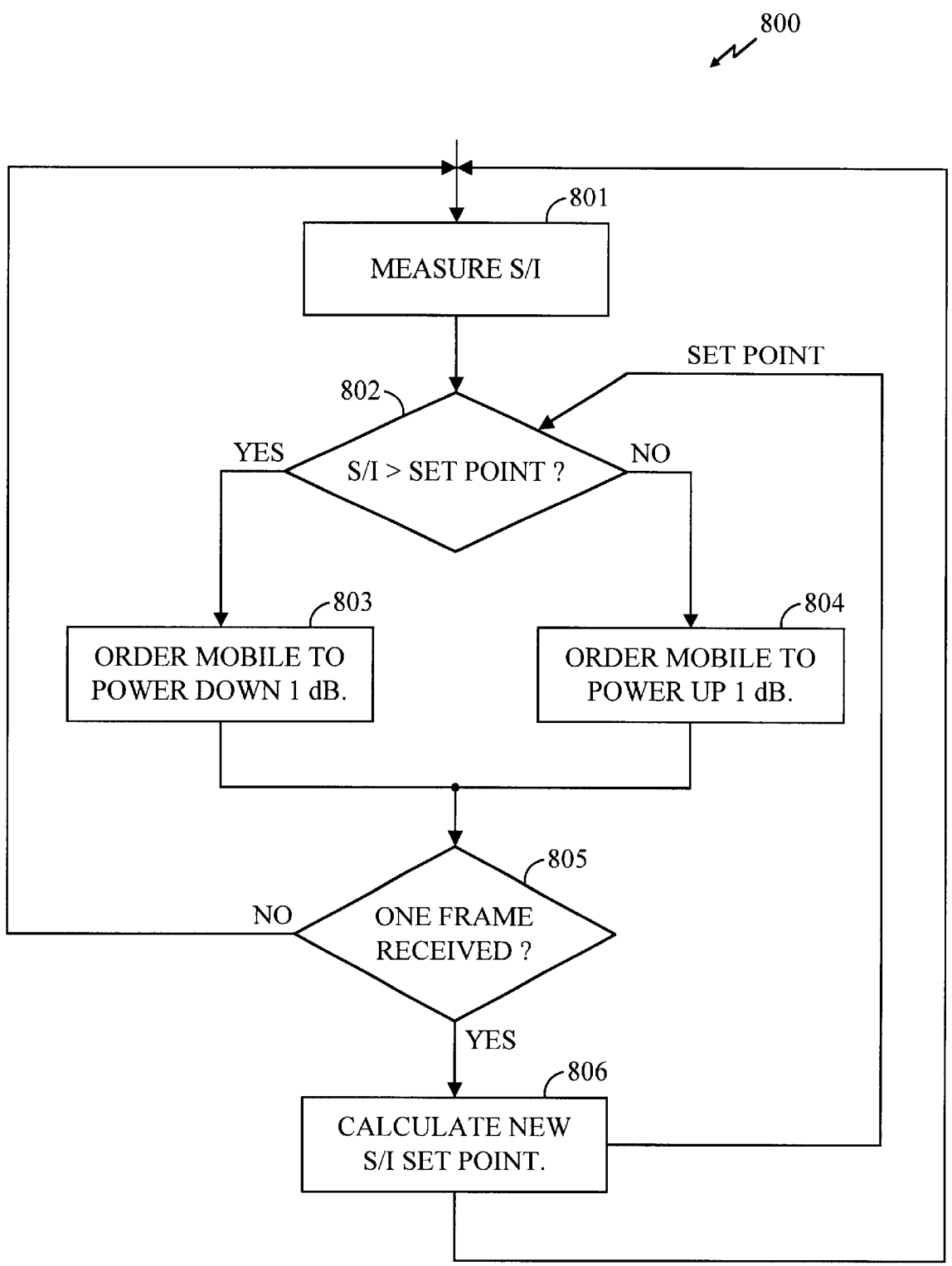
FIG. 8 illustrates a flow diagram of an exemplary closed loop power control.

FIG. 8 illustrates a flow diagram 800 of an exemplary closed loop power control method in accordance with an embodiment. Operation of closed loop power control method 800 begins once an MS in communication system 100 seizes a forward link traffic channel. After the initial access attempt by the MS, the MS sets an initial reverse channel power level. The initial power level setting on the reverse link is then adjusted during the communication link via the closed loop power level control 800. The closed loop power control 800 operates with a faster response time than the open loop control. The closed loop power control 800 provides correction to the open loop power control. In one embodiment, the closed loop power control 800 operates in conjunction with the open loop control during a traffic channel communication link to provide the reverse link power control with a large dynamic range.

To control the power level of the reverse link signal of a mobile station via the closed loop 800, BS 101 at step 801 measures the signal to interference ratio (S/I) of the reverse link signal transmitted from the mobile station. The measured S/I is compared with a set point S/I at step 802. The measured S/I may be in the form of Eb/I which is a ratio of bit energy over interference, and consequently, the set point may be in the same form. The set point is selected for the mobile station. The set point may be initially based on open loop power setting by the mobile station.

If the measured S/I is higher than the set point, at step 803, BS 101 orders the mobile station to power down the power level of its reverse link signal by an amount, for example 1 dB. When the measured S/I is higher than the set point, it indicates that the mobile station is transmitting on the reverse link at a signal power level higher than is needed to maintain an adequate reverse link communication. As a result, the mobile station is ordered to lower the signal power level of its reverse link to reduce the overall system interference. If the measured S/I is lower than the set point, at step 804, BS 101 orders the mobile station to power up the power level of its reverse link signal by an amount, for example 1 dB. When the measured S/I is lower than the set point, it indicates that the mobile station is transmitting on the reverse link at a signal power level lower than is needed to maintain an adequate reverse link communication. As a result of increasing the power level, the mobile station may be able to overcome the interference level and provide an adequate reverse link communication.

The operations performed at steps 802–804 may be referred to as the inner loop power control. The inner-loop power control keeps the reverse link (S/I) at the BS 101 as close as possible to its target threshold as provided by the set point. The target S/I is based on the set point selected for the mobile station. The power up or power down may be performed several times during a time frame. In one embodiment, one time frame may be divided into 16 power control groups. Each power control group consists of several data symbols. The power up or power down command may be transmitted 16 times per frame. If one frame of data has not been received at step 805, the power control loop 800 continues to measure S/I of the reverse link signal during the next power control group at step 801. The process is repeated at steps 802–804.

A single set point or target may not be satisfactory for all conditions. Therefore, the set point used at step 802 may also change depending on a desired reverse link frame error rate. If one frame of data has been received at step 805, a new S/I set point may be calculated at step 806. The new set point becomes the new S/I target for the mobile station. The new set point may be based on a number of factors including frame error rate. For example, if the frame error rate is above a predetermined level, indicating unacceptable frame error rate, the set point may be raised to a higher level. By raising the set point to a higher level, the mobile station consequently increases its reverse link transmit power level via the comparison at step 802 and power up command at step 804. If the frame error rate is below a predetermined level indicating above an acceptable frame error rate, the set point may be lowered to a lower level. By lowering the set point to a lower level, the mobile station consequently decreases it reverse link transmit power level via the comparison at step 802 and power down command at step 803. The operations performed at steps 805–806, and looping back to step 801 for measuring the S/I of the new frames, may be viewed as the outer loop operation. The outer-loop power control may command once every frame, and the closed loop power control may command once every power control group. One frame and one power control group may be, respectively, 20 and 1.25 mSec long, in accordance with one embodiment.

The system may also employ a forward link power control scheme to reduce interference. The MS communicates to the BS periodically about the voice and data quality. The frame error rate and quality measurements are reported to the BS via a power measurement report message. The message contains the number of frames received in error on the reverse link during an interval. The power level of the forward link signal is adjusted based on the number of frame errors. Since such a quality measurement feedback is based on frame error rate, forward link power control is much slower than reverse link power control. For fast response, a reverse link erasure bit may be used to inform the BS whether the previous frame was received with or without error. The channel power gain may be continuously adjusted while monitoring the message or the erasure bit as a way of controlling forward link power level.

For communication of data, the forward link may be transmitted to the MS at a fixed power level while adjusting the effective forward link data rate targeted for the MS. The data rate adjustment on the forward link when viewed for the overall system is a form of interference control. Note that the forward link power control is generally for controlling interference in a coverage area. When the feedback quality measurement is indicating poor reception, the data rate may be lowered while keeping the power level constant to overcome the effect of the interference. The data rate may also be lowered to allow other terminals to receive forward link communication at a higher data rate.

According to at least one of the CDMA Spread Spectrum System standards, incorporated by reference herein, in addition to the open loop and closed loop power control schemes, the MS adjusts the output power level by attributes of a code channel as specified by the standard. In CDMA-2000, the MS sets the output power of the enhanced access channel header, the enhanced access channel data, and the reverse common control channel data relative to the output power level of the reverse pilot channel. The output power level of the reverse pilot channel is set by the open and closed loop power controls. The MS maintains a power level ratio between the code channel power level and the reverse pilot channel power level. The ratio may be defined by the data rate used in the code channel. Generally, a table provides the values for the ratio at different data rates. The ratio generally increases for higher data rates. A ratio equal to one may also be possible. At a ratio equal to one, the power level of the pilot channel as set by the power control loop 800 may be equal to the power level of the code channels. During transmission of data on a traffic channel, the data rate and the traffic channel power level may be adjusted. The power level may be selected based on a relative power of the reverse link pilot. Once an allowable data rate is selected, a corresponding channel gain with respect to the reverse link pilot power level is used to set the traffic channel power level.

In data mode, a BS may be providing communication links to a large number of MSs at different data rates. For example, one MS in a forward link connected state may be receiving data at a low data rate, and another MS receiving at a high data rate. On the reverse link, the BS may be receiving a number of reverse link signals from different MSs. An MS based on an independent measurement may decide and request a desired data rate from the BS. In one embodiment, the desired forward link data rate is communicated to the BS via a data rate control (DRC) channel. The BS attempts to provide a forward link data transfer at the requested data rate. On the reverse link, the MS may autonomously select a reverse link data rate from a number of possible reverse link data rates. In one embodiment, the selected data rate may be communicated to the BS via a reverse rate indicator channel. Each MS may also be limited to a predetermined grade of service. A grade of service may limit the maximum available data rate on the forward and/or reverse links.

Communication of data at high data rates takes a greater transmit/receive signal power level than at low data rates. The forward and reverse links may have similar data rate activities in the case of voice communications. The forward and reverse links data rates may be limited to low data rates since the voice information frequency spectrum is limited. Possible voice data rates are commonly known and described in a code division multiple access (CDMA) communication system standard such as IS-95 and IS-2000, incorporated by reference herein. For data communications, however, the forward and reverse links may not have similar data rates. For example, an MS may be retrieving a large data file from a database. In such a case, the communication on the forward link is predominantly occupied for transmission of data packets. The data rate on the forward link may reach 2.5 Mbps. In one embodiment, the data rate on the forward link may be based on a data rate request made by the MS. In one embodiment, on the reverse link, the data rate is lower, and may range from 4.8 to 153.6 Kbps.

In one embodiment, the operation of closed loop power control 800 involves determining a new set point at step 806. Determining the new set point may be based in part on the frame error rate of the reverse link communications. The process of decoding information and consequently determining a frame error rate as illustrated in FIGS. 4 and 7 may involve interference cancellation of signals. For example, after decoding at step 702, certain signals may be cancelled from the samples of the signals at step 705 before correlation and decoding are repeated at steps 706 and 707. If the decoding at step 707 is satisfactory, there is no need to repeat the interference cancellation as performed at step 705. The decoded data is then used for further processing of each reverse link communications. If no further interference cancellation is performed after step 707, the frame error rate of each reverse link signal is determined based on the decoding results at step 707. The frame error rate for each reverse link channel may be used at step 806 of FIG. 8 to determine a new set point for each corresponding reverse link closed loop power control iteration.

Figure 9:
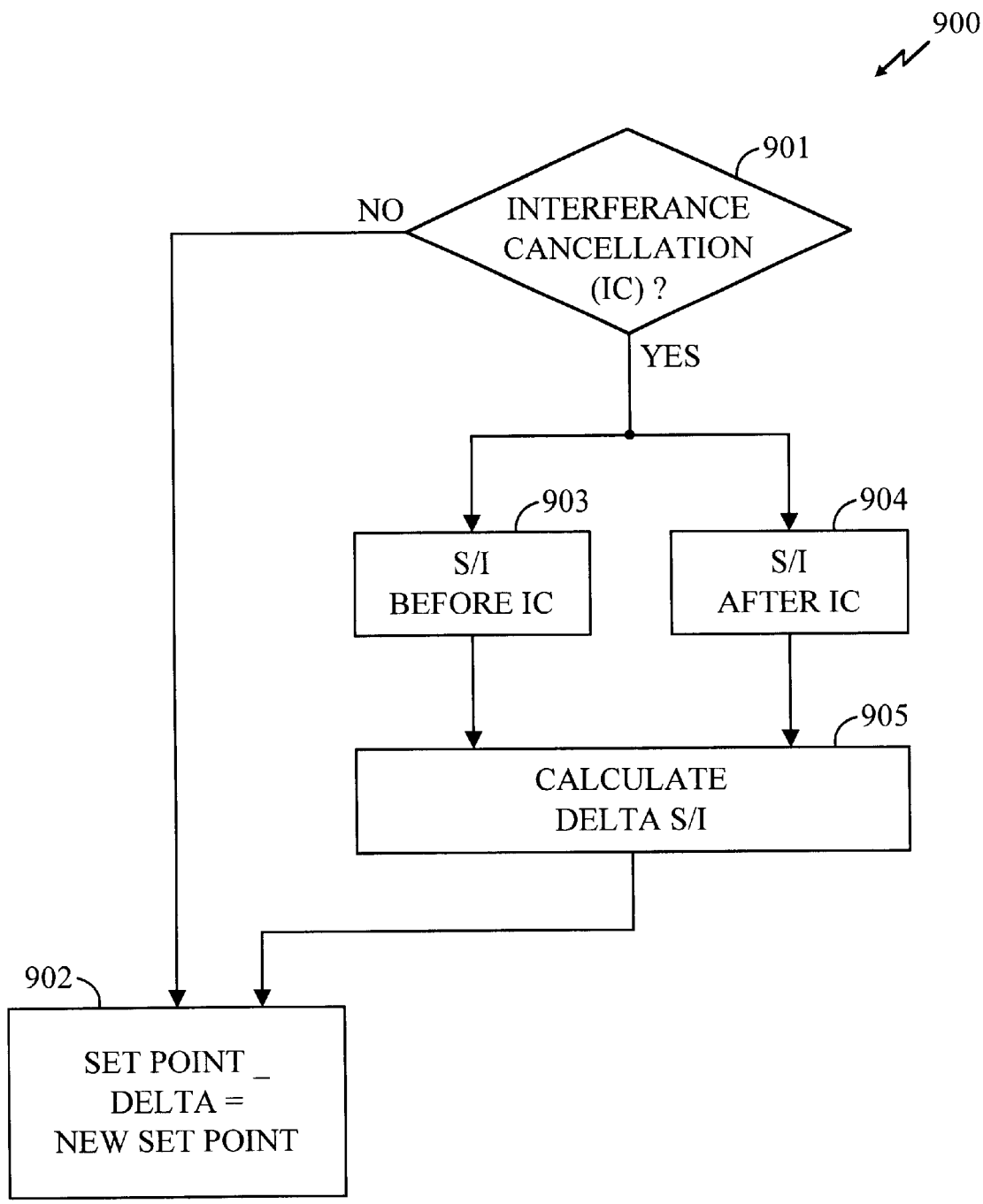
FIG. 9 illustrates a flow chart for determining a new set point to be used in closed loop power control.

FIG. 9 illustrates a flow chart 900 for determining a new set point in accordance with one embodiment. The method illustrated by flow chart 900 may be used at step 806 of closed loop power control 800 of FIG. 8. The method at step 901 includes determining if any interference cancellation has taken place. Normally, if the decoding process shown according to the exemplary embodiment of FIG. 7 involves no interference cancellation such as shown at step 705, a new set point is determined based on the frame error rate. If the frame error rate is increased, the set point is increased at step 902, for example by a predetermined amount, such as 1 dB. If the frame error rate is decreased, the set point is decreased at step 902, for example by a predetermined amount, such as 1 dB. If the decoding process shown according to the exemplary embodiment of FIG. 7 involves interference cancellation like those shown at step 705, a new set point is determined based on the frame error rate and S/I of the signal before and after the cancellation process. At step 903, the S/I of the signal before the interference cancellation is measured. At step 904, the S/I of the signal after the interference cancellation is measured. The S/I measurement may be performed by an exemplary embodiment of receiver 400 shown in FIG. 4. The operations of searcher 406, finger element 408, and possibly combiner 412 may be used to determine the S/I of the received signal before and after the interference cancellation process at step 705. The decoding operation may be performed by decoder 414. After decoding step 702 is performed by decoder 414, if any interference cancellation is decided, for example based on the CRC information, decoder 414 signals sample RAM 404 in connection with control system 410 and associated circuitry to perform the interference cancellation process. At this point, searcher 406, finger element 408, and possibly combiner 412 determine the S/I of the signal before and after the cancellation process. The S/I determined at decoding step 707, after the interference cancellation process, is based on possibly new parameters. The new parameters are used by searcher 406, finger element 408, and possibly combiner 412 for determining the S/I after the cancellation step. The new parameters are used because the interference cancellation performed at step 705 may have changed the signal S/I.

At step 905, the difference (delta value) S/I of the signal before and after the interference cancellation process is determined. At this point, the delta value is provided at step 902 to be incorporated for determining a new set point for the closed loop power control. The new set point may be calculated by subtracting the delta value from the set point calculated based on frame error rate. The new set point is provided at step 802 of FIG. 8 to be used for determining power up and power down commands for the next frame. Use of the S/I based on the interference cancellation process improves, in at least one respect, the reliability of determining power up and power down commands for minimizing the overall interference experienced by the users of the communication system.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method comprising:

performing an interference cancellation process on a received signal;

determining first and second signal to interference ratios of said received signal respectively before and after said performing said interference cancellation;

determining a difference between said first and second signal to interference ratios;

determining, based on said difference, a signal to interference threshold for controlling a power level of a signal transmitted from a source of said received signal.

2. The method as recited in claim 1 further comprising:

determining a frame error rate of said received signal, wherein said determining said signal to interference threshold is based on said difference and said frame error rate.

3. The method as recited in claim 1 further comprising:

decoding said received signal to produce a decoded frame of data;

performing a cyclic redundancy check for said decoded frame of data, wherein said performing said cancellation process is based on whether said cyclic redundancy check passes.

4. The method as recited in claim 1 further comprising:

commanding said source of said received signal to power up or power down the power level of said signal transmitted from said source.

5. In a communication system, a method comprising:

receiving a first signal;

performing an interference cancellation process on said first received signal;

determining first and second signal to interference ratios of said first received signal, respectively before and after said performing said interference cancellation;

determining a difference of said first and second signal to interference ratios;

determining, based on said difference, a signal to interference threshold for controlling a power level of a signal;

receiving a second signal;

measuring a signal to interference of said second received signal;

comparing said signal to interference of said second received signal with said signal to interference threshold;

commanding a source of said signal to power up or down the power level of said signal based on said comparing.

6. The method as recited in claim 5 further comprising:

determining frame error rate of said first received signal, wherein said determining said signal to interference threshold is based on said difference and said frame error rate.

7. The method as recited in claim 5 further comprising:

decoding said first received signal to produce a decoded frame of data;

performing a cyclic redundancy check for said decoded frame of data, wherein said performing said cancellation process is based on whether said cyclic redundancy check passes.

8. In a communication system, an apparatus comprising:

a receiver for receiving a signal;

a signal processor for performing an interference cancellation on said received signal;

a correlator for determining first and second signal to interference ratios of said received signal, respectively before and after said interference cancellation, to produce a difference between said first and second signal to interference ratios;

a controller for determining a signal to interference threshold based on said difference for controlling power level of a signal transmitted from a source of said received signal.

9. The apparatus as recited in claim 8 further comprising:

a decoder for determining a frame error rate of said received signal, wherein said controller determines said signal to interference threshold based on said difference and said frame error rate.

10. The apparatus as recited in claim 8 further comprising:

a decoder for decoding said received signal to produce a decoded frame of data;

wherein said controller further performs a cyclic redundancy check of said decoded frame of data;

wherein said signal processor further performs said cancellation process based on whether said cyclic redundancy check passes.

11. The apparatus as recited in claim 8 further comprising:

a transmitter in operation with said receiver, wherein said transmitter commands a source of said received signal to power up or power down a transmit power level of a signal targeted for said receiver.

12. The apparatus as recited in claim 8 further comprising:

a memory unit for storing samples of said received signal before and after said interference cancellation.

* * * * *